United States Patent Office 3,308,064
Patented Mar. 7, 1967

3,308,064
DERIVATIVES OF CYCLIC KETALS
Raymond C. Schlight and Elmer E. Schallenberg, Fishkill, and Eugene Moroz, New York, N.Y., assignors to Texaco Inc., New York, N.Y., a corporation of Delaware
No Drawing. Filed May 10, 1966, Ser. No. 548,868
9 Claims. (Cl. 252—46.6)

This invention pertains to derivatives of cyclic ketals. More particularly, the invention pertains to reaction products of a steam hydrolyzed, inorganic phosphorus acid free, polyolefin-$P_2S_5$ product and a member selected from the group consisting of a 1,3-dioxolane and a 1,3-dioxane. The invention further relates to the method of manufacturing said reaction products.

The cyclic ketal derivatives formed by the method of the invention are useful as detergent-dispersants in lubricating oils. They are advantageously utilized in finished lubricants in concentrations between about 0.2 and 10%. Lubricating bases employed can be hydrocarbon mineral oils, e.g., those having an SUS viscosity at 100° F. between about 50 and 1000, but usually falling in the SUS viscosity range of between about 70 and 300 at 100° F. Other lubricant bases may be synthetic ester bases such as the high boiling aliphatic dicarboxylic acid esters of monohydric alcohols such as di-2-ethylhexyl sebacate and polyesters described in U.S. 2,628,974. Still other contemplated lubricant bases are the synthetic ether oils such as the polyphenyl ethers.

PROCEDURE

The method for preparing the cyclic ketal derivatives comprises contacting, preferably under conditions of agitation, a steam hydrolyzed, inorganic phosphorus acid free, polyolefin-$P_2S_5$ reaction product with a cyclic ketal selected from the group consisting of:

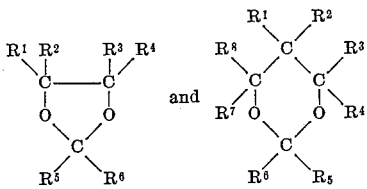

where $R^1$, $R^2$, $R^3$, $R^4$, $R^7$ and $R^8$ are the same or different radicals of less than 11 carbons selected from the group consisting of hydrogen, alkyl, aryl, alkaryl, aralkyl and alkylol and where $R^5$ and $R^6$ are the same or different radicals of less than 11 carbons selected from the group consisting of hydrogen, alkyl, aryl, alkaryl and aralkyl, preferably in the presence of a catalyst such as an acid, base, metallic bases, or metal salts of a weak acid. Under advantageous conditions, the reaction is conducted at a temperature between about 70 and 200° C. for a period of 1 to 40 hours utilizing a mole ratio of hydrolyzed polyolefin-$P_2S_5$ reaction product to cyclic ketal reactant of between about 1:1 and 1:10, preferably between about 1:1 and 1:3. Further, under most advantageous conditions, the amount of catalyst employed constitutes between about 0.001 and 10 wt. percent based on the reaction mixture. Specific examples of suitable catalysts are zinc chloride, sulfuric acid, p-toluene sulfonic acid, sodium methoxide and triethylamine with sodium methoxide being the most preferred.

Desirably, the reaction is conducted until the neut. No. (ASTM D-664) of the final product is less than about 10. Preferably, the reaction is conducted in an inert gas atmosphere such as nitrogen, argon or carbon dioxide. Atmospheric pressures are normally employed although superatmospheric pressures are contemplated particularly when necessary to facilitate the desired contact of the reaction ingredients and/or the removal of undesired substances.

The final cyclic ketal derivative product can be purified, if desired, by standard means such as vacuum distillation at elevated temperature, e.g., between about 70 and 200° C. under a pressure of between about 0.1 and 50 mm. Hg to remove unreacted cyclic ketal reactant and volatile by-products.

Under the most preferred aspects of the method of the invention, the reactants and conditions are as follows: steam hydrolyzed, inorganic phosphorus acid free polybutene (1000–1300 m.w.)-$P_2S_5$ lube oil solution product and 2-methyl-2,5-diethyl-4-methylol-1,3-dioxane as reactants, between about 0.01 and 0.05 wt. percent sodium methoxide as catalyst, nitrogen as inert gas, a mole ratio of said oil solution product to said dioxane of between about 1:1 and 1:3, a reaction temperature between about 140 and 180° C. and a reaction period of about 15 to 25 hours.

HYDROLYZED INORGANIC PHOSPHORUS ACID FREE POLYOLEFIN-$P_2S_5$ REACTANT

The steam hydrolyzed, inorganic phosphorus acid free, polyolefin-$P_2S_5$ reactant is prepared from a polyolefin-$P_2S_5$ precursor. The precursor is formed by reacting a polyolefinic hydrocarbon with $P_2S_5$ (the $P_2S_5$ constituting between about 5 and 40 wt. percent of the reaction mixture) at a temperature between about 100 and 320° C. in the presence of between about 0.1 and 5 wt. percent sulfur. Under preferred conditions, the resultant polyolefin-$P_2S_5$ precursor reaction mixture is normally diluted with mineral oil of a viscosity between about 50 and 1000 SUS at 100° F. The lubricating oil normally constitutes between about 25 and 75 wt. percent of the reaction mass. The purpose of the mineral oil dilution at this point is to liquefy the polyolefin-$P_2S_5$ precursor product in order to facilitate is subsequent treatment. This dilution, however, is an optional procedure. The precursor product or mineral oil concentrate thereof is then contacted with steam, preferably by bubbling therethrough, at a temperature between about 100 and 260° C. to form a mixture of hydrolyzed polyolefin-$P_2S_5$ reaction product and inorganic phosphorus acid. Under the preferred conditions, the unreacted water is continually drawn off as vapor. Advantageously, during the steam hydrolysis at least about 1 mole of steam is employed per mole of polyolefin-$P_2S_5$ reaction product. Steam hydrolysis is normally conducted for a period of about 1 to 20 hours and more.

The inorganic phosphorus acids formed during the steam hydrolysis are then removed. A number of different procedures are available for removal. For example, in U.S. Patents Nos. 2,987,512 and 2,951,835, removal of inorganic phosphorus acid is effected by contact with synthetic hydrous alkaline earth metal silicates and synthetic hydrous alkali metal silicates respectively. In U.S. 3,135,729 a particularly desirable process for removal of the inorganic phosphorus acids from the hydrolyzed polyolefin-$P_2S_5$ product via extraction with anhydrous methanol is described. Broadly, in this extraction process inorganic phosphorus acid removal comprises first drying the mineral oil solution of the hydrolyzed polyolefin-$P_2S_5$ product, e.g., by maintaining temperature of the solution above the boiling point of water, e.g., by maintaining temperature of the solution above the boiling point of water, e.g., between 120 and 200° C. and passing an inert gas such as nitrogen therethrough. The dry concentrate is then contacted under mixing conditions with about 0.5 to 3 volumes of anhydrous methanol per volume of said concentrate at a temperature between about 40 and 80° C. resulting in the formation of an extract phase containing inorganic phosphorus acid and the mineral oil raffinate phase containing the inorganic phosphorus free, steam hydrolyzed $P_2S_5$-polyolefin reaction product. During the extraction procedure superatmospheric pressure may be employed, e.g., up to 50 p.s.i.g. to maintain the methanol in the liquid state. At the end of the extraction step any methanol carried over into the raffinate phase is preferably removed, e.g., by standard procedures such as stripping the raffinate with an inert gas at an elevated temperature.

In the foregoing procedure the $P_2S_5$-polyolefin reaction and the steam hydrolysis of the resultant product is preferably conducted in the presence of an inert atmosphere such as nitrogen.

Examples of the specific polyolefin precursors contemplated are the monoolefinic polymers of an average molecular weight between about 250 and 50,000 such as polyethylene (500 M.W.), polyisobutene (1100 M.W.), polybutene (2000 M.W.), polypropylene (2500 M.W.), polyisopropylene (4000 M.W.) and monoolefinic copolymers such as the propyleneisobutene copolymer (1400 M.W.). Particularly preferred monoolefinic polymers are polyisobutenes having an average molecular weight between about 600 and 5000. Copolymers of conjugated dienes and monoolefins such as copolymer of butadiene and isobutene having an average molecular weight in the prescribed range are also contemplated.

THE 1,3-DIOXOLANE AND 1,3-DIOXANE REACTANTS

Specific examples of the 1,3-dioxolane reactants contemplated herein are 2,2-dimethyl-4-methylol-1,3-dioxolane; 2-benzyl-4,5-diphenyl-1,3-dioxolane; 2-ethyl-4-benzyl-5,5-dipropyl-1,3-dioxolane; 2,2 - dimethyl-4-tolyl-1,3-dioxolane; and 2,2,4,5-tetramethyl-5-ethylol-1,3-dioxolane.

Specific examples of the 1,3-dioxane reactants contemplated herein are 2-methyl-2,5-diethyl-5-methylol-1,3-dioxane; 2,2-dimethyl-4-phenyl-1,3-dioxane; 2,5,5-trimethyl-2-ethyl-1,3-dioxane; 2 - propyl-6-benzyl-1,3-dioxane; 4-tolyl-1,3-dioxane; 2-methyl-2-ethyl-5,5-dimethylol-1,3-dioxane; and 2,5,5-trimethyl-2-ethyl-1,3-dioxane.

EXAMPLES

The following examples further illustrate the method of the invention but are not to be construed as limitations thereof:

Example I

This example illustrates the preparation of the steam hydrolyzed, inorganic phosphorus acid free polyalkene-$P_2S_5$ reactant.

A polyisobutene (1100 M.W.)-$P_2S_5$ reactant is prepared by contacting with agitation at about 232° C. 15,100 lbs. of polyisobutene of an average molecular weight of about 1100 with 4000 lbs. $P_2S_5$ in the presence of 150 lbs. sulfur. The reaction is continued under agitation conditions for 6 hours and until the reaction mixture is soluble in n-pentane. The reaction product is then diluted with 23,450 lbs. of naphthene base petroleum oil having an SUS viscosity at 100° F. of about 100. Steam is then bubbled through the formed polyisobutene-$P_2S_5$ reaction product containing lube oil concentrate at about 180° C. for 10 hours utilizing a steam rate of 487 lbs./hr. The resultant steam hydrolyzed concentrate is dried by passage of nitrogen therethrough at 180° C. The steam hydrolyzed lube oil concentrate is extracted with about 50% by volume of methanol at 66° C. to give a methanol extract containing inorganic phosphorus acid and a lubricating oil raffinate containing inorganic phosphorus acid free, steam hydrolyzed polyisobutene (1100 M.W.)-$P_2S_5$ reaction product. The oil raffinate is separated from the methanol extract phase and blown with nitrogen at about 122° C. to remove any residual methanol.

Example II

This example and the following examples illustrate the method and product of the invention.

To a 5 liter flask there was charged 2800 grams of hydrolyzed, inorganic phosphorus acid free, polyisobutene (1100 M.W.)-$P_2S_5$ oil raffinate of the type prepared in Example I together with 2 grams of sodium methoxide and a blanket of nitrogen was superimposed over the reaction mixture. The reaction mixture was heated to 150° C. and the 2-methyl-2,5-diethyl-5-methylol-1,3-dioxane was added dropwise in a total amount of 282 grams. After completion of the 1,3-dioxane addition, the reaction mixture was stirred at 150° C. for 20 hours and then stripped to a pot temperature of 150° C. under 1 mm. Hg pressure. Fifty grams of unreacted 1,3-dioxane reactant were recovered in said stripping. The pot residue was identified as a lube oil solution of the 2-methyl-2,5-diethyl-5-methylol-1,3-dioxane derivative of steam hydrolyzed, inorganic phosphorus acid free, polyisobutene (1100 M.W.)-$P_2S_5$ reaction product, said derivative having a neut. No. of 3 and a hydroxyl No. of 36.

Example III

The procedure of Example II was essentially repeated except 350 grams of steam hydrolyzed, inorganic phosphorus acid free, polyisobutene-$P_2S_5$ raffinate of the type prepared in Example I and 32 grams of 2-methyl-2,5-diethyl-5-methylol-1,3-dioxane were employed as reactants and no sodium methoxide and stripping were employed. The reaction was conducted for a period of about 18 hours. The final product was identified as the lube oil solution of the 2-methyl-2,5-diethyl-5-methylol-1,3-dioxane derivative of steam hydrolyzed, inorganic phosphorus acid free, polyisobutene (1100 M.W.)-$P_2S_5$ reaction product, said solution having a neut. No. of 4.8.

Example IV

The method of Example II was essentially repeated except 350 grams of hydrolyzed polyisobutene-$P_2S_5$ reactant and 35 grams of 1,3-dioxane reactant were employed and 1 gram of zinc chloride was substituted for the sodium methoxide as catalyst. After addition of the dioxane reactant the reaction was continued at 150° C. for 14 hours and the stripping was conducted at 120° C. under 1 mm. Hg pressude. The stripped residue was identified as a lube oil solution of the 2-methyl-2,5-diethyl-5-methylol-1,3-dioxane derivative of steam hydrolyzed, inorganic phosphorus acid free, polyisobutene (1100 M.W.)-$P_2S_5$ reaction product, said solution having a neut. No. of 4.4 and a hydroxyl No. of 27.

Example V

The procedure of Example II was essentially repeated except 700 grams of steam hydrolyzed, polyisobutene-$P_2S_5$ reactant of the type prepared in Example I and 59 grams 1,3-dioxane reactant were used. Further, 3 mls. of sulfuric acid were substituted for the sodium methoxide. Still further, the reaction was stirred after the dioxane reactant addition for 17 hours and then stripped at 150° C. under 1 mm. Hg pressure. The final residue product was identified as the lube oil solution of the 2-methyl-2,5-diethyl-5-methylol-1,3-dioxane derivative of steam hydrolyzed, inorganic phosphorus acid free, polyisobutene (1100 M.W.)-$P_2S_5$ reaction product, said solution having a neut. No. of 5.61.

Example VI

The procedure of Example II was essentially repeated except 280 grams of steam hydrolyzed polybutene-$P_2S_5$ reactant and 28 grams 1,3-dioxane reactant were utilized.

Further, 1 gram of triethylamine was substituted for the sodium methoxide. The reactants and catalyst were combined and stirred and heated under 80° C. under nitrogen for 7 hours. The final residue was identified as lube oil solution of the 2-methyl-2,5-diethyl-5-methylol-1,3-dioxane derivative of steam hydrolyzed, inorganic phosphorus acid free, polyisobutene (1100 M.W.)-$P_2S_5$ reaction product, said residue having a neut. No. of 8.9.

*Example VII*

The procedure of Example II was essentially repeated except 2800 grams of the hydrolyzed polybutene-$P_2S_5$ reactant and 282 grams of the 1,3-dioxane were employed. Further, after the 1,3-dioxane addition, the reaction was conducted for 19 hours. The final product was identified as the lube oil solution of the 2-methyl-2,5-diethyl-5-methylol-1,3-dioxane derivative of steam hydrolyzed, inorganic phosphorus acid free, polyisobutene (1100 M.W.)-$P_2S_5$ reaction product and was analyzed to have a 1.1 wt. percent phosphorus content (calc. 1 wt. percent), a 0.48 wt. percent sulfur content (calc. 0.5 wt. percent) and a hydroxyl No. of 32 (calc. 40).

*Example VIII*

The procedure of Example II was essentially employed except 280 grams of steam hydrolyzed, inorganic phosphorus acid free, polyisobutene (1100 M.W.)-$P_2S_5$ raffinate of the type prepared in Example I and 38 grams of 2-methyl-2-ethyl-5,5-dimethylol-1,3-dioxane were utilized as reactants. Further, the reaction was conducted for a period of about 17 hours. The final product was identified as the lube oil solution of 2-methyl-2-ethyl-5,5-dimethylol-1,3-dioxane derivative of the hydrolyzed, inorganic phosphorus acid free, polyisobutene (1100 M.W.)-$P_2S_5$ reaction product, said solution having a neut. No. of 3.8 and a hydroxyl No. of 7.

*Example IX*

The procedure of Example II was essentially employed except the reactants and catalyst utilized were 140 grams of the steam hydrolyzed polyisobutene-$P_2S_5$ product raffinate of the type prepared in Example I, 8 grams of 2,5,5-trimethyl-2-ethyl-1,3-dioxane and 1 gram sodium methoxide. The reaction was conducted for a period of about 18 hours. The product was identified as the lube oil solution of the 2-ethyl-2,5,5-trimethyl-1,3-dioxane derivative of hydrolyzed, inorganic phosphorus acid free polyisobutene (1100 M.W.)-$P_2S_5$ reaction product, said solution having a neut. No. of 7.4.

We claim:
1. A method of preparing a cyclic ketal derivative comprising:
   (a) contacting $P_2S_5$ with an aliphatic polyolefin of an average molecular weight between about 250 and 50,000 in the presence of between about 0.1 and 5 wt. percent sulfur at a temperature between about 100 and 320° C., the $P_2S_5$ comprising between about 5 and 40 wt. percent of the reaction mixture to form a polyolefin-$P_2S_5$ first reaction product;
   (b) contacting said polyolefin-$P_2S_5$ first reaction product with steam in a mole ratio of steam to said first reaction product of at least about 1 at a temperature between about 100 and 260° C. to form a steam hydrolyzed, inorganic phosphorus acid containing polyolefin-$P_2S_5$ second reaction product;
   (c) separating said inorganic phosphorus acid from said second reaction product;
   (d) contacting the resultant inorganic phosphorus acid free, hydrolyzed second reaction product with a cyclic ketal compound of the general formula:

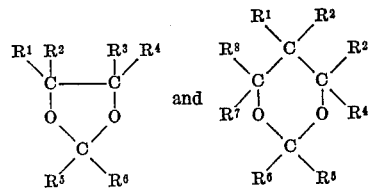

where $R^1$, $R^2$, $R^3$, $R^4$, $R^7$ and $R^8$ are radicals of less than 11 carbons selected from the group consisting of hydrogen, alkyl, aryl, alkaryl, aralkyl and alkylol and where $R^5$ and $R^6$ are radicals of less than 11 carbons selected from the group consisting of hydrogen, alkyl, aryl, alkaryl and aralkyl, in a mole ratio of said cyclic ketal compound to said hydrolyzed, inorganic phosphorus acid free second reaction product of between about 1:1 and 10:1 to form an inorganic phosphorus acid free, steam hydrolyzed polyolefin-$P_2S_5$ derivative of said cyclic ketal compound.

2. A method in accordance with claim 1 wherein the polyolfin-$P_2S_5$ first reaction product of said "a" step prior to contacting with steam in said "b" step is diluted with a mineral lubricating oil of an SUS viscosity at 100° F. of between about 50 and 1000 to form a diluted polyolefin-$P_2S_5$ reaction mixture having a mineral lubricating oil content of about 25 and 75 wt. percent, wherein reaction step "d" is conducted in the presence of between about 0.001 and 10 wt. percent catalyst selected from the group consisting of sodium methoxide, p-toluene sulfonic acid, sulfuric acid, zinc chloride and triethylamine.

3. A method in accordance with claim 2 wherein said polyolefin is polyisobutene of an average molecular weight of about 1100, said cyclic ketal compound is 2-methyl-2,5-diethyl-5-methylol-1,3-dioxane, said catalyst is sodium methoxide, said contacting in said "d" step is conducted for a period of about 20 hours, and as an added step subjecting the final reaction mixture of step "d" to a vacuum distillation at a temperature of about 150° C. under a pressure of about 1 mm. Hg to leave as residue said derivative of said cyclic ketal compound.

4. The method in accordance with claim 2 wherein said polyolefin is polyisobutene of an average molecular weight of about 1100, said cyclic ketal is 2-methyl-2-ethyl-5,5-dimethylol-1,3-dioxane, said catalyst is sodium methoxide and said contacting in said "d" step is conducted for a period of about 17 hours.

5. The method in accordance with claim 2 wherein said polyolefin is polyisobutene of an average molecular weight of about 1100, said cyclic ketal is 2,5,5-trimethyl-2-ethyl-1,3-dioxane, said catalyst is sodium methoxide and said contacting in said "d" step is conducted for a period of about 18 hours.

6. The cyclic ketal derivative of claim 1.
7. The cyclic ketal derivative of claim 3.
8. The cyclic ketal derivative of claim 4.
9. The cyclic ketal derivative of claim 5.

References Cited by the Examiner
UNITED STATES PATENTS 3,206,474   9/1965   Hechenbleikner et al. _ 260—953
3,209,014   9/1965   Hechenbleikner et al. _ 260—953

DANIEL E. WYMAN, *Primary Examiner.*

L. G. XIARHOS, *Assistant Examiner.*